(12) United States Patent
Oishi

(10) Patent No.: US 11,218,606 B2
(45) Date of Patent: Jan. 4, 2022

(54) SHEET CONVEYANCE DEVICE AND PROGRAM FOR SHEET CONVEYANCE DEVICE

(71) Applicant: TOSHIBA TEC KABUSHIKI KAISHA, Tokyo (JP)

(72) Inventor: Sadatoshi Oishi, Fuji Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/096,723

(22) Filed: Nov. 12, 2020

(65) Prior Publication Data

US 2021/0234976 A1 Jul. 29, 2021

(30) Foreign Application Priority Data

Jan. 28, 2020 (JP) .............................. JP2020-011484

(51) Int. Cl.
*G06F 3/12* (2006.01)
*H04N 1/00* (2006.01)

(52) U.S. Cl.
CPC ..... *H04N 1/00342* (2013.01); *H04N 1/00602* (2013.01)

(58) Field of Classification Search
CPC ....................... H04N 1/00342; H04N 1/00602
USPC .................. 358/1.1–1.18, 474, 496
See application file for complete search history.

(56) References Cited

U.S. PATENT DOCUMENTS

| | | | |
|---|---|---|---|
| 8,334,754 B2 | 12/2012 | Kasai et al. | |
| 10,289,883 B2* | 5/2019 | Jacobsen | G06K 7/10435 |
| 2008/0181827 A1* | 7/2008 | Bassler | G01N 21/6486 |
| | | | 422/119 |
| 2010/0103451 A1 | 4/2010 | Tsuzuki | |
| 2019/0303631 A1* | 10/2019 | Ogawa | H04W 4/33 |
| 2020/0065532 A1* | 2/2020 | Yaginuma | G06K 7/10128 |
| 2020/0104555 A1* | 4/2020 | Kishimoto | G06K 7/10316 |

(Continued)

FOREIGN PATENT DOCUMENTS

| | | |
|---|---|---|
| EP | 2154552 A1 | 2/2010 |
| JP | 2000231609 A | 8/2000 |
| JP | 2006003597 A | 1/2006 |

(Continued)

OTHER PUBLICATIONS

Extended European Search Report dated May 19, 2021, mailed in counterpart European Application No. 20214189.1, 12 pages.

*Primary Examiner* — Gabriel I Garcia
(74) *Attorney, Agent, or Firm* — Kim & Stewart LLP

(57) ABSTRACT

A sheet conveying apparatus of an embodiment includes a conveyance path along which a sheet can be conveyed, and a plurality of conveyance rollers configured to move a sheet along the conveyance path. A wireless tag reader/writer is configured to read information from, and write information to, a wireless tag of a sheet on the conveyance path. A phase change detector is configured to detect a phase change in response waves received by the wireless tag reader/writer from a wireless tag. A tag specifying unit is configured to identify whether a wireless tag is moving along the conveyance path based on the detected phase change in response waves from the wireless tag. A controller controls the wireless tag reader/writer to write information to the wireless tag identified as moving along the conveyance path.

20 Claims, 5 Drawing Sheets

(56) References Cited

U.S. PATENT DOCUMENTS

2020/0184161 A1* 6/2020 Pettus .................... G01S 7/025

FOREIGN PATENT DOCUMENTS

| JP | 2008137784 A | 6/2008 |
|---|---|---|
| WO | 2016112910 A1 | 7/2016 |

* cited by examiner

FIG. 4

| INDEX | ELAPSED TIME (ms) | TAG ID | Phase(deg) |
|---|---|---|---|
| 1 | 0 | AAAABBBBOOO1 | 20 |
| 2 | 1 | CCCCDDDD0002 | 162 |
| 2 | 10 | AAAABBBBOOO1 | 40 |
| 4 | 11 | CCCCDDDD0002 | 161 |
| 5 | 20 | AAAABBBBOOO1 | 60 |
| 6 | 21 | CCCCDDDD0002 | 163 |

SHEET CONVEYANCE DEVICE AND PROGRAM FOR SHEET CONVEYANCE DEVICE

CROSS-REFERENCE TO RELATED APPLICATIONS

This application is based upon and claims the benefit of priority from Japanese Patent Application No. 2020-011484, filed on Jan. 28, 2020, the entire contents of which are incorporated herein by reference.

FIELD

Embodiments described herein relate generally to a sheet conveying apparatus and a program.

BACKGROUND

Conventionally, an image forming apparatus conveys a sheet from a sheet cassette or a manual feeding tray and then forms an image on the conveyed sheet. In some examples, sheets of a certain type incorporate a wireless tag (e.g., an RFID tag). In order to read and write information to and from a wireless tag of such a sheet, the image forming apparatus incorporates a wireless tag communication device along the sheet conveyance path.

A technique of performing reading and writing to tags while the resonance frequency of the transmission antenna is changed such that the frequency deviation between the resonance frequency of the transmission antenna and the transmission signal being supplied to the transmission antenna falls within an allowable range in order to prevent the deterioration in the antenna communication performance due to a decrease in the resonance current is known.

However, if information is to be written to a wireless tag of a sheet while moving on a conveyance path, the communication area of the wireless tag communication apparatus becomes relatively wide. As such, the wireless tag communication device may also inadvertently communicate with other wireless tags on the sheet or on the conveyance path, and may thus write information to these other wireless tags in error. For example, the wireless tag communication device may inadvertently write information to a wireless tag on a sheet that is not yet on the conveyance path, such as a sheet still in a sheet cassette.

BRIEF DESCRIPTION OF THE DRAWINGS

FIG. 4 is a schematic diagram depicting phase data stored in a phase storage portion.

DETAILED DESCRIPTION

According to an embodiment, a sheet conveying apparatus of an embodiment comprises a conveyance path along which a sheet can be conveyed, and a plurality of conveyance rollers configured to move a sheet along the conveyance path. A wireless tag reader/writer is configured to read information from, and write information to, a wireless tag of a sheet on the conveyance path. A phase change detector is configured to detect a phase change in response waves received by the wireless tag reader/writer from a wireless tag. A tag specifying unit is configured to identify whether a wireless tag is moving along the conveyance path based on the detected phase change in response waves from the wireless tag. A controller is configured to control the wireless tag reader/writer to write information to the wireless tag identified as moving along the conveyance path.

A sheet conveyance apparatus of an embodiment can appropriately write information to a wireless tag on a sheet that is being moved along a conveyance path. Hereinafter, an image forming apparatus incorporating a sheet conveying apparatus according to an embodiment will be described as an example.

Figure 1:
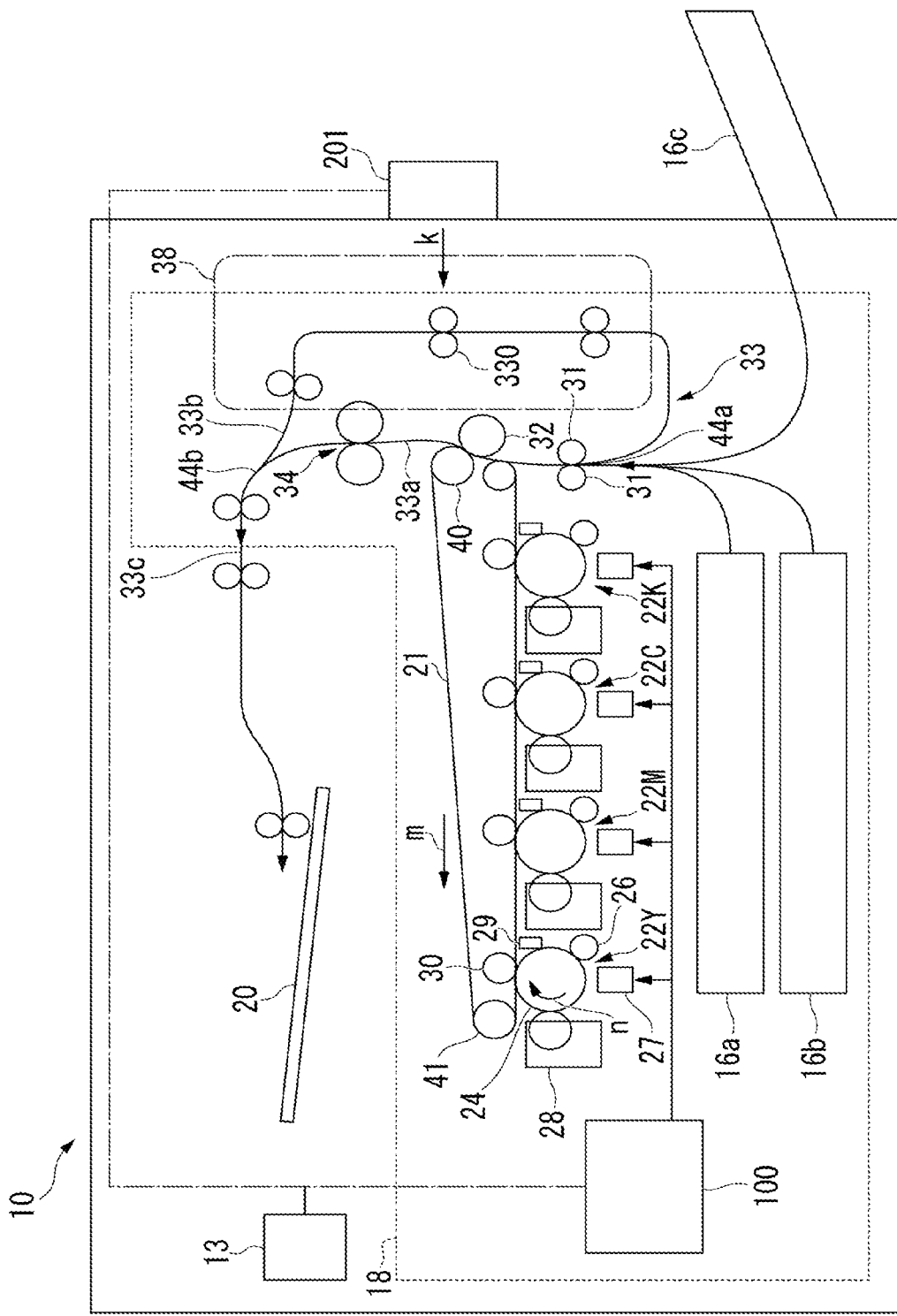
FIG. 1 is schematic diagram of an image forming apparatus according to an embodiment.

First, a configuration of the image forming apparatus 10 according to an embodiment will be described with reference to FIG. 1. FIG. 1 depicts an image forming apparatus 10 according to an embodiment.

In FIG. 1, the image forming apparatus 10 includes a control panel 13, a wireless tag communication device 201, and a printer unit 18. The printer unit 18 includes an image forming controller 100, a sheet cassette 16a, and a sheet cassette 16b. The image forming controller 100 controls the control panel 13, the wireless tag communication device 201, and the printer unit 18. The image forming controller 100 controls conveyance of sheets in the printer unit 18. In particular, control of the conveyance of the sheets is to control the conveyance timing of a sheet, the stop position of a sheet, the conveyance speed of a sheet, and the like.

The control panel 13 includes an input key and a display unit. For example, the input key accepts input from a user. For example, the display unit is a touch panel type. The display unit receives an input and displays the input. For example, the control panel 13 displays an item of information related to the operation of the image forming apparatus 10 on the display unit so as to be able to set or adjust parameters or settings associated with the item. The control panel 13 notifies the image forming controller 100 of inputs and changes to settings made by the user.

The sheet cassettes 16a and 16b store sheets on which a wireless tag is provided. The sheet cassettes 16a and 16b can also store sheets on which a wireless tag is not provided (e.g., a normal or standard sheet of paper or the like). In the following description, unless otherwise specified, references to a sheet refer to a sheet in or on which a wireless tag is provided. For example, a material such as paper or a plastic film can be used as the sheet.

The printer unit 18 performs operations for forming an image on the sheet. For example, the printer unit 18 prints an image corresponding to image data on a sheet. In the following description, forming an image on a sheet will also be referred to as "printing". In the present embodiment, the printer unit 18 is a device for fixing a toner image to the sheets, but the present disclosure is not limited thereto, and the printer unit may be an ink jet type device or the like.

In this example, the printer unit 18 includes an intermediate transfer belt 21. The printer unit 18 supports the belt 21 by the driven roller 41, the backup roller 40, and the like. The printer unit 18 rotates the intermediate transfer belt 21 in the direction indicated by the arrow m in FIG. 1. The printer unit 18 includes four sets of image forming stations 22Y, 22M, 22C, and 22K. The image forming stations 22Y, 22M, 22C, and 22K correspond to Y (yellow), M (magenta), C (cyan), and K (black), respectively. The image forming stations 22Y, 22M, 22C and 22K are arranged on the lower side of the intermediate transfer belt 21 in order along the rotation direction of the intermediate transfer belt 21.

Hereinafter, the image forming station 22Y of Y (yellow) from among the image forming stations 22Y, 22M, 22C, and 22K will be described as an example. The image forming stations 22M, 22C and 22K have the same configuration as that of the image forming station 22Y, and therefore detailed description thereof will be omitted.

The image forming station 22Y includes an electrostatic charger (charger) 26, an exposure scanning head 27, a developing device 28, and a photosensitive cleaner 29. The charger 26, the exposure scanning head 27, the developing device 28, and the cleaner 29 are disposed around the photosensitive drum 24 that rotates in the direction of the arrow n in FIG. 1.

The image forming station 22Y includes a first transfer roller 30. The first transfer roller 30 is disposed so as to face the photosensitive drum 24 via the intermediate transfer belt 21.

The charger 26 uniformly charges the photosensitive drum 24. The exposure scanning head 27 selectively exposes the uniformly charged photosensitive drum 24 to form an electrostatic latent image on the photosensitive drum 24. The developing device 28 develops the electrostatic latent image on the photosensitive drum 24 by supplying a two-component developer (formed of a toner and a carrier) to the photosensitive drum 24.

The first transfer roller 30 transfers the toner image formed on the photosensitive drum 24 to the intermediate transfer belt 21 (this may be referred to as a primary transfer). The first transfer roller 30 of each of the image forming stations 22Y, 22M, 22C, and 22K transfers the respective toner images onto the intermediate transfer belt 21, thereby forming a color toner image on the intermediate transfer belt 21. The color toner image is a toner image formed by sequentially supplying toner images of Y (yellow), M (magenta), C (cyan), and K (black). The cleaner 29 removes the toner remaining on the photosensitive drum 24 after the primary transfer.

The printer unit 18 includes a second transfer roller 32. The second transfer roller 32 is disposed so as to face the backup roller 40 via the intermediate transfer belt 21. The second transfer roller 32 transfers all of the color toner images on the intermediate transfer belt 21 to the sheet (this may be referred to as a secondary transfer). In the following description, the term "toner image" may refer a multi-color toner image or a toner image of only one color (monochromatic). The toner image may be a toner image formed using a decolorable toner.

The conveyance path 33 is a path through which a sheet is conveyed by conveyance rollers (for example, the conveyance rollers 330 and the like). In this example, the conveyance path 33 includes a first conveyance path 33a, a second conveyance path 33b, and a third conveyance path 33c. The first conveyance path 33a is a conveyance path from a merging portion 44a to a branch portion 44b. The second conveyance path 33b is a conveyance path passing through the inside of an inversion unit 38 (also referred to as a reversing unit), and is a conveyance path that is different from the branch portion 44b to the merging portion 44a and is different from the first conveyance path 33a. The third conveyance path 33c is a conveyance path from the branch portion 44b to a sheet discharge tray 20.

The sheet to be processed can be taken out from any one of the sheet cassette 16a, the sheet cassette 16b, or a manual feeding tray 16c. After being taken out, the sheet is temporarily stopped at a portion where the two registration rollers 31 are in contact with each other. At this time, the leading edge of the sheet is brought into contact with the registration roller 31, and any inclination (angling) of the sheet edge is also corrected. The image forming controller 100 starts the rotation of the registration roller 31 in accordance with the expected position of the toner image on the rotating intermediate transfer belt 21, and thus moves the sheet to the position of the second transfer roller 32 at an appropriate timing to receive the toner image from the intermediate transfer belt.

That is, the toner image formed on the intermediate transfer belt 21 is secondarily transferred to the sheet at the second transfer roller 32. Subsequently, the transferred toner image is fixed to the sheet by a fixing device 34. In this way, an image is formed (printed) on the sheet under the control of the image forming controller 100. The image forming controller 100 then conveys the printed sheet to the third conveyance path 33c, and discharges the sheet.

The wireless tag communication device 201 includes an arithmetic device, a storage device, and an antenna. The wireless tag in this example, is a radio frequency identifier (RFID) tag. The wireless tag communication device 201 transmits radio waves along the arrow k direction depicted in FIG. 1. The wireless tag communication device 201 is able to communicate with a wireless tag provided in a sheet being conveyed. Specifically, the wireless tag communication device 201 reads information from the wireless tag and writes information to the wireless tag.

The information written to the wireless tag includes, for example, information indicating a identification of the printed sheet/document, information indicating an intended destination of the sheet/document, and/or contents printed on the sheet/document for when the sheet is subsequently distributed or the like. In the present embodiment, the wireless tag communication device 201 uses, for example, a radio wave system (UHF) in the 900 MHz band. However, the communication method/protocol and the frequency band are not limited, and other methods and frequency bands may be employed in other examples.

Next, double-sided printing operations will be described.

Figure 2:
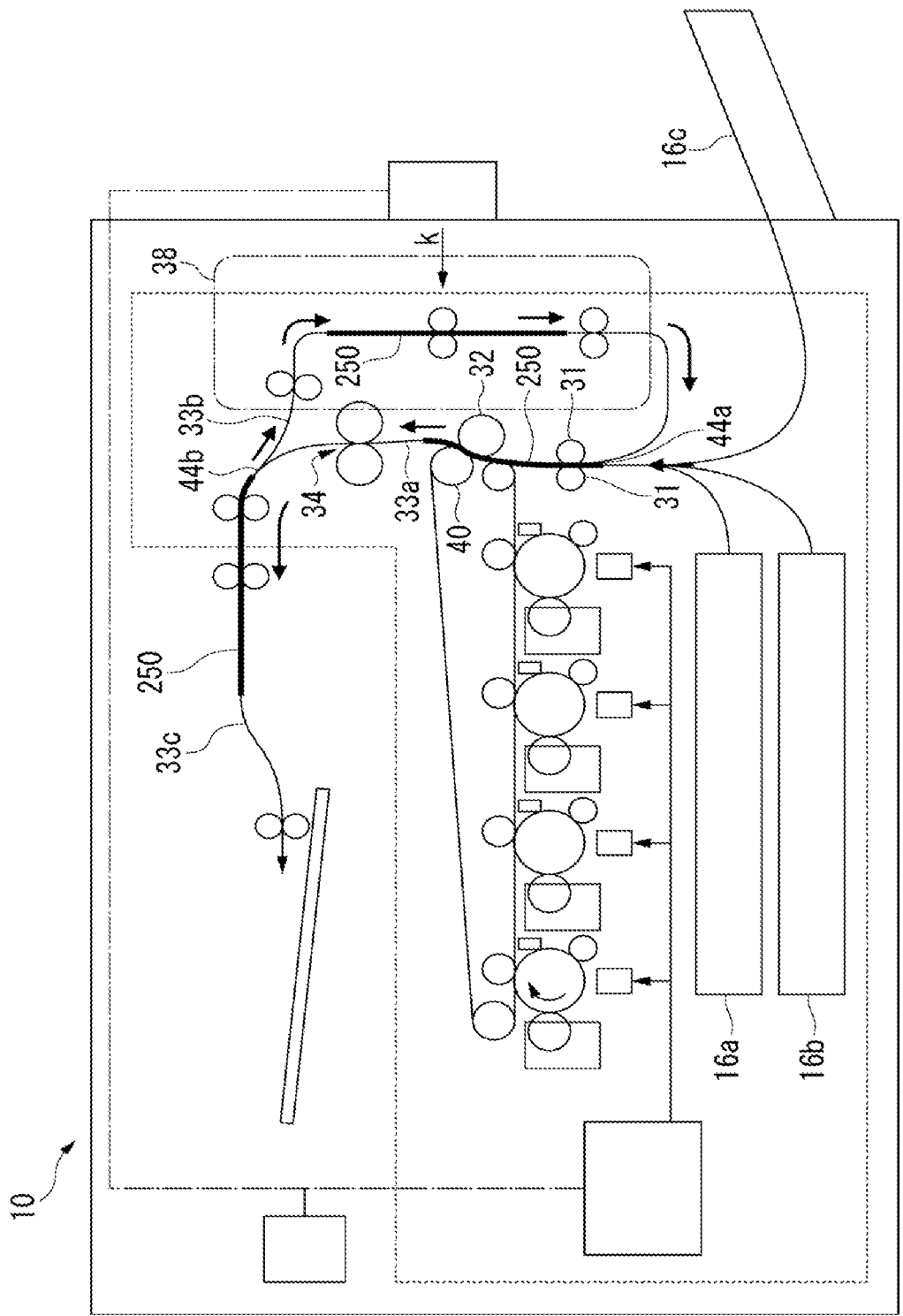
FIG. 2 is a schematic diagram of a sheet flow for double-sided printing.

FIG. 2 is an explanatory diagram illustrating an example of double-sided printing.

In the case of the double-sided printing, the sheet 250 is taken out from any one of sheet feeding locations, such as the sheet cassette 16a, the sheet cassette 16b, or the manual feeding tray 16c. The sheet 250 is then conveyed to the first conveyance path 33a. More specifically, the sheet 250 fed from one of the sheet feeding locations is corrected in inclination at the registration roller 31. Then, the sheet 250 is conveyed to the position of the second transfer roller 32 to match with the position of the toner image formed on the intermediate transfer belt 21. The toner image formed on the intermediate transfer belt 21 is transferred to the front side of the sheet 250 by the second transfer roller 32. Then, the toner image on the front side of the sheet 250 is fixed by the fixing device 34.

The sheet 250 on which the image has been formed on the front side next enters the third conveyance path 33c. Then, under the control of the image forming controller 100, the sheet 250 is switched back and conveyed to the second conveyance path 33b. Thereafter, the sheet 250 is conveyed to the merging portion 44a via the second conveyance path 33b in the inversion unit 38. The sheet 250 is next conveyed to the first conveyance path 33a via the registration roller 31. Accordingly, the sheet 250 passing through the second conveyance path 33b is conveyed to the first conveyance path 33a so that the back surface side now faces toward the intermediate transfer belt 21 side.

Then, a toner image formed on the intermediate transfer belt 21 is transferred to the back surface side of the sheet 250 by the second transfer roller 32. The toner image transferred to the back surface side of the sheet 250 is fixed by the fixing device 34. Then, the sheet 250 is supplied to the third conveyance path 33c, and is sent out to the sheet discharge tray 20.

Figure 3:
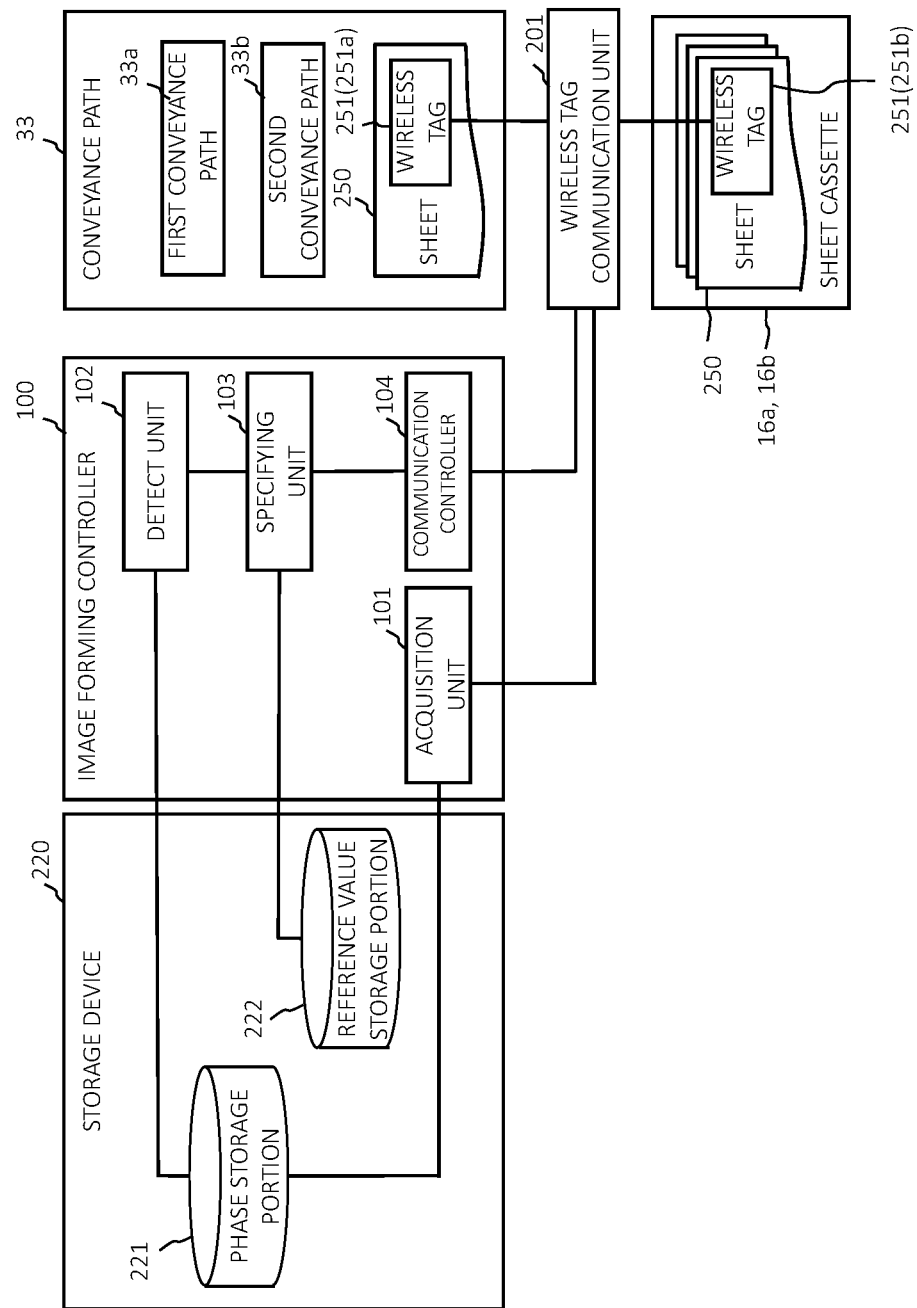
FIG. 3 is a block diagram of a sheet conveying apparatus according to an embodiment.

Next, a sheet conveying apparatus 50 included in the image forming apparatus 10 will be described with reference to FIG. 3. FIG. 3 is a block diagram illustrating an example of a functional configuration of the sheet conveying apparatus 50 according to an embodiment.

In FIG. 3, the sheet conveying apparatus 50 includes an image forming controller 100, a wireless tag communication device 201, a storage device 220, and a conveyance path 33. The image formation control unit 100 controls the wireless tag communication device 201 in accordance with a sheet conveyance program stored in the storage device 220.

The image forming controller 100 is realized by, for example, a central processing unit (CPU), an application specific integrated circuit (ASIC), or the like. The storage device 220 is realized by a read only memory (ROM), a random access memory (RAM), a hard disk drive (HDD), a solid-state drive (SSD), or the like.

The wireless tag communication device 201 attempts to read an identification code (ID) of a wireless tag 251 (provided in a sheet 250) within a communication area at a certain, fixed interval (for example, at a 10 msec interval). Specifically, the wireless tag communication device 201 transmits a signal (carrier wave) at a predetermined interval. When a wireless tag 251 in the communication area receives a signal from the wireless tag communication device 201, the wireless tag 251 receives electric power from this signal and starts up. The wireless tag communication device 201 can be a wireless tag reader/writer device. Then, the wireless tag 251 transmits a response wave including the ID of the wireless tag communication device 201 previously written or otherwise stored in the wireless tag 251. Accordingly, the wireless tag communication device 201 receives a response wave from the wireless tag 251 and acquires the ID data corresponding to the wireless tag 251 ID.

The wireless tag communication device 201 is capable of communicating with the image forming controller 100. The wireless tag communication device 201 receives a response wave from the wireless tag 251 provided in the sheet 250 at regular intervals and transmits phase data indicating the phase of the received response wave to the image formation controller 100.

The image forming controller 100 includes an acquisition unit 101, a detect unit 102, a specifying unit 103, and a communication controller 104. The respective units 101 to 104 are not limited to being provided within the image forming controller 100 and may be provided in another control unit (another CPU, an ASIC, or the like) different from the image forming controller 100.

The acquisition unit 101 acquires the phase data of the response wave received from the wireless tag 251 by the wireless tag communication device 201. More specifically, the acquisition unit 101 acquires the phase data of the response wave from the wireless tag communication device 201 at a certain interval (for example, at a 10 msec interval). The acquisition unit 101 starts acquisition of the phase data every time a sheet 250 begins to be printed.

The acquisition unit 101 stores the acquired phase data of the response waves in a phase storage portion 221 of the storage device 220 for each interval (for example, at a 10 msec interval). Here, when the sheet 250 (more particularly, the wireless tag 251 of the sheet 250) moves, the phase of the response wave from the wireless tag 251 changes. For example, the response wave from a sheet 250 (the wireless tag 251 therein) moving on the first conveyance path 33a tends to change according to a common change pattern of specific phases. On the other hand, if a sheet 250 (wireless tag 251) is not moved, the phase of the response wave from the wireless tag does not change substantially.

In addition, in the present embodiment, the information can be written to the wireless tag 251 while the sheet 250 is moving through the conveyance path 33. Therefore, the communication area of the wireless tag communication device 201 needs to be set relatively wide. More specifically, the communication area of the wireless tag communication device 201 is a wider than would be the case if the sheet 250 could be completely stopped and information written to the wireless tag 251 only while the sheet is stationary at a specific location. For this reason, if information is to be written to the wireless tag 251 while the sheet 250 is moving along the conveyance path 33, the potential for information to be inadvertently written to another wireless tag 251 within the communication area instead of the intended target wireless tag 251 to which the information is to be written increases.

Therefore, to compensate for this increase potential for inadvertent writing, the detect unit 102 refers to the phase data stored in the phase storage portion 221, and detects a phase change amount of the response wave acquired from wireless tags 251 within the communication area at regular intervals. The phase change amount is, for example, a value indicating a difference in phase acquired at different times from an initial, previous, or reference time. More specifically, in this example, the phase change amount is a difference between the response wave phases stored at a timing interval of 10 msec.

The specifying unit 103 identifies a wireless tag 251 to be read/written (hereinafter referred to as a "target wireless tag 251a") based on the amount of phase change of the response wave detected by the detect unit 102. Specifically, when the phase change amount of the response wave is equal to or larger than some predetermined value (for example, 10°), the specifying unit 103 specifies the wireless tag 251 for which such a phase change amount is obtained as the target wireless tag 251a.

A wireless tag 251 (the target wireless tag 251a) for which the phase change amount of the response wave is equal to or more than the predetermined value is considered to be on a sheet 250 is being moved along some portion of the conveyance path 33 (for example, the first conveyance path 33a). Accordingly, the specifying unit 103 can identify the wireless tag 251 being moved as the target wireless tag 251a.

The communication controller 104 controls the wireless tag communication device 201 so as to write information to the target wireless tag 251a as specified by the specifying unit 103. The wireless tag communication device 201 writes information to the target wireless tag 251a in accordance with the control of the communication controller 104.

(Comparison of Change Patterns of the Phase of the Response Wave)

A reference value storage portion 222 stores in advance a reference value of the phase of the response wave when the sheet 250 moves on the conveyance path (hereinafter referred to as a "phase reference value"). Specifically, the phase reference value is a change pattern (reference pattern) of the phase of the response wave associated with the normal conveyance of a sheet 250. In the present embodiment, the reference pattern is, for example, a change pattern that increases by 20° for each 10 msec.

The phase reference value can be obtained by conveying one test sheet 250 in an environment in which other wireless tags 251 are not present around the sheet. For example, such phase reference value(s) can be provided before shipment of the image forming apparatus 10 from a factory or the like. The phase reference value is, for example, a value that can be different for different image forming apparatuses 10. The phase reference value is not necessarily required to be a factory setting, and for example, the phase reference value may be obtained by prompting a user to obtain a reference value by operation of the image forming apparatus 10 during a user setup mode or the like.

The specifying unit 103 identifies the target wireless tag 251a based on the result of the comparison between the phase change amount detected by the detect unit 102 and the phase reference value stored in the reference value storage portion 222. Specifically, for example, the specifying unit 103 compares the change pattern indicated by the phase change amount detected by the detect unit 102 with the reference pattern stored in the reference value storage portion 222. As a result of the comparison, the specifying unit 103 is able to identify a particular wireless tag 251 that has output a response wave corresponding to the phase reference pattern as the target wireless tag 251a when the detected and reference patterns are approximately the same.

(Control of Wireless Tags 251 which are not Subject to Reading and Writing)

Further, the specifying unit 103 identifies a non-target wireless tag 251 (hereinafter referred to as a "non-target wireless tag 251b") that is not a target for reading and writing, based on the phase change amount detected by the detect unit 102. The non-target wireless tag 251b is, for example, a wireless tag 251 provided in a sheet 250 still in the sheet cassettes 16a, 16b, or on the manual feed tray 16c.

The communication controller 104 requests the non-target wireless tag 251b specified by the specifying unit 103 to suppress the output of response waves. More specifically, the communication controller 104 controls the wireless tag communication device 201 to transmit a response suppression command to the non-target wireless tag 251b for suppressing the output of response waves. In response to this response suppression command, the non-target wireless tag 251b turns on a response suppression flag for prevent the output of a response wave from the non-target wireless tag 251b until subsequent commands.

The response suppression flag can be reset by cutting off the output of radio waves from the wireless tag communication device 201. The output of radio waves from the wireless tag communication device 201 is thus cut every time a new printing of a sheet 250 is to be performed. Thus, the response suppression flag can be reset every time the printing of a sheet 250 is performed.

(A Position to Write Information to the Target Wireless Tag 251a)

In some examples, the position at which the information is written to the target wireless tag 251a may be set to be on the first conveyance path 33a, but in the present embodiment, this position is on the second conveyance path 33b. In the present embodiment, the conveyance path 33 includes a first conveyance path 33a, a second conveyance path 33b, and a third conveyance path 33c, which may be considered portions and/or branches of the overall conveyance path 33.

The first conveyance path 33a is the portion of the conveyance path 33 used for forming an image on a sheet 250. The first conveyance path 33a can be used for performing a front surface printing on a sheet 250 fed directly from one the cassettes 16a, 16b, but may also be used for a back surface printing on a sheet 250 returned via the inversion unit 38. The second conveyance path 33b is the path by which a sheet 250 is returned through the inversion unit 38 after previously passing through the first conveyance path 33a. In this example, the second conveyance path 33b is a position closer to the wireless tag communication device 201 than is the first conveyance path 33a.

The detect unit 102 is used to detect the phase change amount in the response wave from sheets 250 traveling along the first conveyance path 33a. The specifying unit 103 identifies a target wireless tag 251a based on the phase change amount(s) detected by the detect unit 102. The communication controller 104 controls the wireless tag communication device 201 to write the information to the target wireless tag 251a when the target wireless tag 251a identified by the specifying unit 103 moves to the second conveyance path 33b.

The communication controller 104 determines whether or not the sheet 250 with the target wireless tag 251a has moved to the second conveyance path 33b. The communication controller 104 may determine that the sheet 250 with the target wireless tag 251a has moved to the second conveyance path 33b based on, for example, the timing of switching functions along the conveyance path 33 for switch back (inversion) processing.

The sheet 250 on the second conveyance path 33b is subsequently returned to the first conveyance path 33a again. When a single-sided printing is set, backside printing (second printing) is not performed on the sheet 250 returned to the first conveyance path 33a. However, when the backside printing is set to be performed, the backside printing is performed.

(Phase Data Example Stored in the Phase Storage Portion 221)

FIG. 4 is an explanatory diagram illustrating an example of phase data stored in the phase storage portion 221. As illustrated in FIG. 4, phase data 400 includes items corresponding to an "Index", an "elapsed time", a "tag ID", and a "Phase".

"Index" items are information (e.g. an index number or a counting value) for identifying each piece of data. The "elapsed time" is the elapsed time since the start of a printing operation corresponding to when the particular tag ID and phase value were detected. For example, the time elapsed since the wireless tag communication device 201 transmits the first signal (carrier wave) in the printing operation can be used as the elapsed time value. The "tag ID" value is unique identification information allocated for each of the different wireless tags 251. In this context, "Phase" information indicates a detect phase value (0° to 180°) for a response wave.

In the phase data 400 depicted in FIG. 4, wireless tags 251 two different "tag IDs", "AAAABBBB0001" and "CCCCDDDD0002," are illustrated. That is, FIG. 4 shows that two different "tag IDs" corresponding to two different the wireless tags 251 are in the communication area. When there are 3 or more types of "tag IDs" in the communication area of the wireless tag communication device 201. The phase data 400 can include "tag IDs" corresponding to any number of wireless tags 251 detected in the communication area, but here only two different tags 251 are represented in FIG. 4.

Next, the phase change amount of the wireless tag 251 having the tag ID "AAAABBBB0001" will be described. As indicated at the value "1" in the "Index" column, the "Phase" of the response wave of the wireless tag 251 with the tag ID "AAAABBBB0001" at elapsed time of 0 msec is 20°. As indicated at the value "3" in the "Index" column, the "Phase" of the response wave of the wireless tag 251 with the tag ID "AAAABBBB0001" at 10 msec is 40°. Thus, the phase change amount for the response wave of the wireless tag 251 with the tag ID AAAABBBB0001 is +20° from 0 msec to 10 msec. This phase change amount (magnitude change) is equal to or larger than a predetermined value (for example, 10°) indicating travel/movement of the wireless tag 251.

As indicated by value "5" in the "Index" column, the "Phase" of the response wave of the wireless tag 251 with the tag ID "AAAABBBB0001" at the 20 msec is 60°. For this reason, the phase change amount of the response wave of the wireless tag 251 with the tag ID "AAAABBBB0001" from 10 msec to 20 msec is again +20° (magnitude change of 20°).

The phase change amount is again equal to or larger than the predetermined value (for example, 10°). That is, the wireless tag 251 ("AAAABBBB0001") is estimated to be a wireless tag 251 on a sheet 250 being moved. The comparison between the phase change amount and the predetermined value is, for example, a comparison of absolute values. The phase change pattern obtained from the phase change amounts over time for a particular wireless tag 251 can be compared to a reference pattern stored in the reference value storage portion 222, for example.

Accordingly, it can be estimated that the sheet 250 with the wireless tag 251 having the tag ID "AAAABBBB0001" is moving along the conveyance path 33. Therefore, the specifying unit 103 identifies the wireless tag 251 having the tag ID "AAAABBBB0001" as target wireless tag 251a.

Next, the phase change amount of the wireless tag 251 having the tag ID "CCCCDDDD0002" will be described. As indicated by value "2" in the "Index" column, the "Phase" of the response wave of the wireless tag 251 with the tag ID "CCCCDDDD0002" at 1 msec is 162°. As indicated by value "4" in the "Index" column, the "Phase" of the response wave of the wireless tag 251 with the tag ID "CCCCDDDD0002" at 11 msec is 161°. Therefore, the phase change amount of the response wave of the wireless tag 251 with the tag ID "CCCCDDDD0002" from 1 msec to 11 msec is −1° (the absolute size change is 1°). This amount of phase change is less than the predetermined value (for example, 10°).

As indicated by the value "6" in the "Index" column, the "Phase" of the wireless tag 251 with the tag ID "CCCCDDDD0002" at the 21 msec is 163 degrees. Thus, the amount of phase change in the response wave of the wireless tag 251 with the tag ID "CCCCDDDD0002" from 11 msec to 21 msec is +2° (the absolute size is 2°). The amount of phase change is less than the predetermined value (for example, 10°). The difference in the detected phase change amount is presumably due to a minor error in measurement or the like. That is, it can be considered that there has been almost no change in the phase change amount for the wireless tag 251 with the tag ID "CCCCDDDD0002".

Accordingly, it can be estimated that the sheet 250 with the wireless tag 251 having the tag ID "CCCCDDDD0002" is not on the conveyance path 33. More specifically, it can be estimated that the sheet 250 with the wireless tag 251 having the tag ID "CCCCDDDD0002" is in one of the sheet cassettes 16a, 16b, or on the manual feed tray 16c. Therefore, the specifying unit 103 identifies the wireless tag 251 having the tag ID "CCCCDDDD0002" as the non-target wireless tag 251b.

(Processing Related to Reading and Writing of Information with the Wireless Tag 251 Performed by the Image Forming Apparatus 10)

Figure 5:
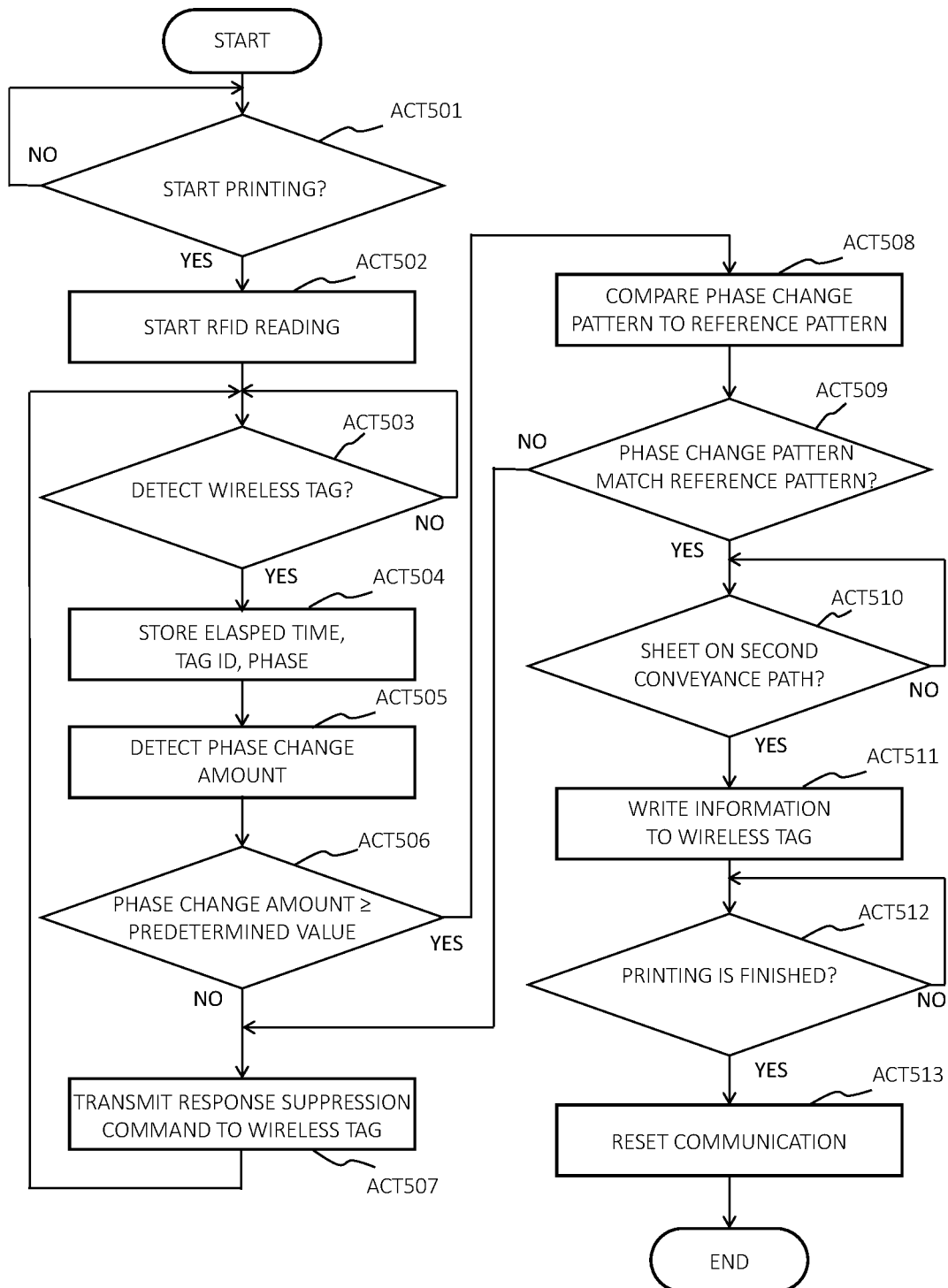
FIG. 5 is a flowchart of a process related to reading and writing of information from and to a wireless tag.

Next, an example of processing related to reading and writing of information from and to the wireless tag 251 performed by the image forming apparatus 10 (or more particularly a sheet conveyance device 50) will be described with reference to FIG. 5. FIG. 5 is a flowchart illustrating an example of a process related to reading and writing of information with respect to the wireless tags 251 as performed by the image forming apparatus 10.

In FIG. 5, the image forming apparatus 10 determines whether a printing has been started (ACT501). The printing in this context is, for example, a printing on a single sheet 250. The image forming apparatus 10 waits (ACT501: NO) until the start of printing. When the image forming apparatus 10 starts the printing (ACT501: YES), the image forming apparatus 10 starts RFID reading (ACT502). Specifically, the image forming controller 100 controls the wireless tag communication device 201 to start transmission of a carrier wave signal at regular intervals and begins reception of any response wave(s).

Then, the image forming apparatus 10 determines whether or not the wireless tag 251 has been detected (ACT503). In ACT503, specifically, the image forming controller 100 determines whether or not the wireless tag communication device 201 has received a response wave from a wireless tag 251. When the wireless tag communication device 201 does not detect any wireless tag 251, the image forming apparatus 10 stands by (ACT503: NO). When the wireless tag communication device 201 detects a wireless tag 251 (ACT503: YES), the image forming apparatus 10 stores the relevant data items (that is, values for the "elapsed time", "tag ID", and "Phase") of the phase data 400 as obtained by receiving the response wave from a wireless tag 251.

Then, the image forming apparatus 10 detects, measures, or calculates the phase change amount for a wireless tag 251 indicated by a previously received tag ID (ACT505) if available. Then, the image forming apparatus 10 determines whether or not the phase change amount is equal to or larger than some predetermined value (ACT506). When the phase change amount is equal to or larger than the predetermined value (ACT506: YES), the image forming apparatus 10 proceeds to ACT508. When the phase change amount is not equal to or larger than the predetermined value (ACT506: NO), the image forming apparatus controls the wireless tag communication device 201 to transmit a response suppression command addressed to the particular (estimated as none moving) wireless tag 251 (ACT507), and returns to ACT503.

Then, the image forming apparatus 10 compares the phase change pattern for a particular wireless tag estimated as possibly moving in the prior step(s) with the reference pattern stored in the reference value storage portion 222 (ACT508). Next, the image forming apparatus 10 determines whether or not the phase change pattern matches, or substantially coincides with, the reference pattern (ACT509). When the phase change pattern does not match the reference pattern (ACT509: NO), the image forming apparatus 10 returns to ACT507.

When the phase change pattern matches the reference pattern (ACT509: YES), the image forming apparatus 10 next determines whether or not the sheet 250 having the wireless tag 251 has been passed to the second conveyance path 33b (ACT510). A sheet 250 passing through the second conveyance path 33b can be determined, for example, by detecting that the entire sheet 250 has passed the branch portion 44b and being conveyed to the second conveyance path 33b by switching back the sheet 250.

The image forming apparatus 10 waits until the sheet 250 is on the second conveyance path 33b (ACT510: NO). When the sheet 250 is deemed on the second conveyance path 33b (ACT510: YES), the image forming apparatus 10 controls the wireless tag communication device 201 to write information to the wireless tag 251 (ACT511).

Then, the image forming apparatus 10 determines whether or not the printing is finished (ACT512). The image forming apparatus 10 stands by until the printing is completed (ACT512: NO). Once the printing is finished (ACT512: YES), the image forming apparatus 10 controls the wireless tag communication device 201 to reset the communication with the wireless tags 251 (ACT513), and ends the present series of processes.

By resetting the communication with the wireless tags 251, the outputting of radio waves from previously suppressed wireless tags 251 is reset since the response suppression flag in any of the wireless tags 251 is reset. The collected phase data 400 can also be reset by the reset of the communication with the wireless tag 251.

In the flowchart illustrated in FIG. 5, the processing of the ACT506 (determination of the amount of phase change) and the processing of the ACT508 and ACT509 (the comparison of the change pattern to a reference pattern) are performed, but the processing is not limited to this. For example, the processes may be performed together or just one of the processes may be performed.

According to the embodiment described above, the wireless tag communication device 201 can be controlled so that the target wireless tag 251a is first identified based on the phase change amount of the response wave and then the information is written to the target wireless tag 251a. Accordingly, the sheet conveyance device 50 can appropriately write information to the intended wireless tag 251 of a sheet 250 actually moving on the conveyance path 33. That is, erroneous (unintended) writing of information to a wireless tag 251 of a sheet 250 in the sheet cassettes 16a, 16b, or on the manual feed tray 16c can be avoided.

In addition, in the present embodiment, the sheet conveyance apparatus 50 specifies the target wireless tag 251a based on a result of the comparison between the phase change pattern of the response wave output from the wireless tag 251 and a reference pattern for the phase of the response wave of a sheet 250 moved on the conveyance path 33. Accordingly, it is possible to more accurately identify a sheet 250 moving on the conveyance path 33, and thus it is possible to more appropriately write information to the wireless tag 251 of the sheet 250 that moves on the conveyance path 33.

In addition, in the present embodiment, the sheet conveyance device 50 specifies the non-target wireless tag(s) 251b on the basis of the phase change amount of the response wave output from the wireless tag 251, and controls the non-target wireless tag(s) 251b to suppress the output of a response wave. Accordingly, it is possible to prevent a response wave from being output from the wireless tag 251 that is not required. Here, if the wireless tag communication device 201 receives a response wave from a wireless tag 251 that is not targeted for writing, an operation of reading the ID of the wireless tag 251 is still performed accordingly, and the operation of reading the ID of a wireless tag 251 may still require an interval longer than, for example, 10 msec to perform associated processing.

However, according to the present embodiment, it is possible to suppress the output of the unnecessary response wave from the untargeted wireless tags 251, and therefore, it is possible to prevent unnecessary operations associated with reading the ID of such wireless tags 251. In other words, it is possible to suppress the processing load (and delays) related to the reception of the unnecessary response waves by the wireless tag communication device 201. Therefore, it is possible to more appropriately detect the phase changes of the response wave(s), and thus it is possible to more appropriately write the information to the intended wireless tag 251 of a sheet 250 moving on the conveyance path 33.

In the present embodiment, the sheet conveyance device 50 specifies the non-target wireless tag 251b based on the phase change amount of the response wave while on the first conveyance path 33a, and then writes the information to the wireless tag 251 when the sheet 250 moves to the second conveyance path 33b. Accordingly, it is possible to secure a period for detecting the phase change amount of the response wave on the first conveyance path 33a. That is, it is possible to appropriately detect the phase change amount of the response wave. Therefore, it is possible to more accurately determine that a particular sheet 250 is moving on the conveyance path 33. In addition, it is possible to secure a period in which information is written to the wireless tag 251 when on the second conveyance path 33b. Therefore, it is possible to appropriately write information to the wireless tag 251 of the sheet 250 while on the second conveyance path 33b.

In the present embodiment, the first conveyance path 33a is first used for performing front surface printing, and the second conveyance path 33b is used for performing the back surface printing (that is, the conveyance path 33b is the sheet reversing or return path). This makes it possible to efficiently write information to the wireless tag 251 of a moving sheet 250 using an existing conveyance path 33 without separately providing a conveyance path specifically dedicated to reading and writing information to and from the wireless tag 251.

In the present embodiment, the second conveyance path 33b is at a position closer to the wireless tag communication device 201 than the first conveyance path 33a. Accordingly, it is possible to shorten the communication distance to the wireless tag 251, and thus it is possible to more appropriately write the information to the wireless tag 251 of the sheet 250 on the second conveyance path 33b.

The function(s) of a sheet conveying apparatus 50 in the above-described embodiment may be realized by a computer. In this case, a program for realizing the function(s) may be recorded in a non-transitory, computer-readable recording medium, and the program recorded in the recording medium may be loaded into a computer system and then executed by the computer system. In this context, a "computer system" includes, for example, an operating system, hardware, a peripheral device, and the like. A "computer-readable recording medium" refers to a portable medium such as a flexible disk, a magneto-optical disk, a ROM, or a CD-ROM, and a storage device such as a hard disk built in the computer system. Further, the "computer-readable recording medium" may include a cloud-based storage system or the like and a program can be transmitted via a network such as the Internet or a communication line such as a telephone line from a computer system serving as a server or a client. The program may be a program for realizing a part of the functions described above or may be a program for realizing the above-described functions in combination with a program already recorded in the computer system.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed:

1. A sheet conveying apparatus, comprising:
a conveyance path along which a sheet can be conveyed
a plurality of conveyance rollers configured to move a sheet along the conveyance path;
a wireless tag reader/writer configured to read information from, and write information to, a wireless tag of a sheet on the conveyance path;
a phase change detector configured to detect a phase change in response waves received by the wireless tag reader/writer from a wireless tag;
a tag specifying unit configured to identify whether a wireless tag is moving along the conveyance path based on the detected phase change in response waves from the wireless tag; and
a controller configured to control the wireless tag reader/writer to write information to the wireless tag identified as moving along the conveyance path.

2. The sheet conveying apparatus according to claim 1, wherein the tag specifying unit is configured to identify whether the wireless tag is moving along the conveyance path by comparison of the detected phase change in response waves from the wireless tag to a previously stored reference pattern corresponding to phase changes in response waves for a wireless tag moving along the conveyance path.

3. The sheet conveying apparatus according to claim 1, wherein the tag specifying unit is configured to identify a wireless tag that is not moving along the conveyance path by a lack of phase change in response waves from the wireless tag over intervals of time.

4. The sheet conveying apparatus according to claim 3, wherein the wireless tag reader/writer is configured to output a response suppression signal addressed to the wireless tag identified by the tag specifying unit as not moving along the conveyance path.

5. The sheet conveying apparatus according to claim 1, wherein the conveyance path comprises a first portion along which an image is transferred to the sheet in a printing operation, and a second portion along which the sheet travels to be returned to the first portion.

6. The sheet conveying apparatus according to claim 5, wherein the second portion is closer to the wireless tag reader/writer than is the first portion.

7. The sheet conveying apparatus according to claim 6, wherein the controller is configured to cause the wireless tag reader/writer to write information to an identified wireless tag while the identified tag is on the second portion of the conveyance path.

8. The sheet conveying apparatus according to claim 1, wherein the wireless tag is an RFID tag.

9. An image forming apparatus, comprising:
a first conveyance path portion along which a sheet can be conveyed past a transfer roller at which an image can be transferred to a surface of the sheet;
a second conveyance path portion along which a sheet from the first conveyance path portion can be returned to the first conveyance path portion for an image to be transferred to another surface of the sheet;
a wireless tag reader/writer configured to read information from and write information to a wireless tag of a sheet in the image forming apparatus;
a phase change detector configured to detect a phase change in response waves received by the wireless tag reader/writer from a wireless tag;
a tag specifying unit configured to identify whether a wireless tag is moving along the first conveyance path portion based on the detected phase change in response waves from the wireless tag; and
a controller configured to control the wireless tag reader/writer to write information to the identified wireless tag while the wireless tag is moving along the second conveyance path portion.

10. The image forming apparatus according to claim 9, wherein the tag specifying unit is configured to identify whether the wireless tag is moving along the first conveyance path portion by comparison of the detected phase change in response waves from the wireless tag to a previously stored reference pattern corresponding to phase changes in response waves for a wireless tag moving along the first conveyance path portion.

11. The image forming apparatus according to claim 9, wherein the tag specifying unit is configured to identify a wireless tag that is not moving along the first or second conveyance path portion by a lack of phase change in response waves from the wireless tag over intervals of time.

12. The image forming apparatus according to claim 11, wherein the wireless tag reader/writer is configured to output a response suppression signal addressed to the wireless tag identified by the tag specifying unit as not moving along the first or second conveyance path portion.

13. The image forming apparatus according to claim 9, wherein the second conveyance path portion is closer to the wireless tag reader/writer than is the first conveyance path portion.

14. The image forming apparatus according to claim 9, wherein the wireless tag is an RFID tag.

15. A non-transitory computer-readable recording medium storing therein a program causing a sheet conveying apparatus to perform a method comprising:
convey a sheet including a wireless tag along a conveyance path;
read information from the wireless tag of the sheet being conveyed along the conveyance path using a wireless tag reader/writer;
detect a phase change in response waves received from the wireless tag by the wireless tag reader/writer;
identify whether the wireless tag is moving along the conveyance path based on the detected phase change in response waves from the wireless tag; and
cause the wireless tag reader/writer to write information to the wireless tag identified as moving along the conveyance path.

16. The non-transitory computer-readable recording medium according to claim 15, the method further comprising:
identifying whether the wireless tag is moving along the conveyance path by comparison of the detected phase change in response waves from the wireless tag to a previously stored reference pattern corresponding to phase changes in response waves for a wireless tag moving along the conveyance path.

17. The non-transitory computer-readable recording medium according to claim 15, the method further comprising:
   causing the wireless tag reader/writer to output a response suppression signal addressed to any wireless tag identified as not moving along the conveyance path.

18. The non-transitory computer-readable recording medium according to claim 15, wherein the conveyance path comprises a first portion along which an image is transferred to the sheet in a printing operation, and a second portion along which the sheet travels to be returned to the first portion.

19. The non-transitory computer-readable recording medium according to claim 18, the method further comprising:
   causing the wireless tag reader/writer to write information to an identified wireless tag while the identified tag is on the second portion of the conveyance path.

20. The non-transitory computer-readable recording medium according to claim 15, wherein the wireless tag is an RFID tag.

* * * * *